United States Patent
Miyagi et al.

(10) Patent No.: US 7,107,607 B2
(45) Date of Patent: Sep. 12, 2006

(54) IMAGE DATA COMMUNICATION SYSTEM AND METHOD THEREOF, AND IMAGE PICKUP APPARATUS AND IMAGE DATA PROCESSING METHOD

(75) Inventors: Shiro Miyagi, Tokyo (JP); Kimio Maki, Tokyo (JP); Mio Ozawa, Chiba (JP)

(73) Assignee: Sony Corporation, (JP)

( * ) Notice: Subject to any disclaimer, the term of this patent is extended or adjusted under 35 U.S.C. 154(b) by 777 days.

(21) Appl. No.: 09/871,194

(22) Filed: May 31, 2001

(65) Prior Publication Data

US 2002/0047916 A1    Apr. 25, 2002

(30) Foreign Application Priority Data

May 31, 2000  (JP) .......................... P2000-163344

(51) Int. Cl.
- H04N 7/173 (2006.01)
- H04N 5/232 (2006.01)
- G06F 13/12 (2006.01)

(52) U.S. Cl. .................... 725/105; 348/211.1; 710/62; 455/556.2

(58) Field of Classification Search .......... 348/231.99, 348/231.3, 207.99, 207.1, 207.11, 211.99, 348/211.1, 552; 375/240.25; 455/556.2, 455/557
See application file for complete search history.

(56) References Cited

U.S. PATENT DOCUMENTS

| | | | |
|---|---|---|---|
| 5,471,577 A | * | 11/1995 | Lightbody et al. .......... 345/837 |
| 5,631,701 A | * | 5/1997 | Miyake .................... 348/222.1 |
| 5,666,159 A | * | 9/1997 | Parulski et al. .......... 348/211.2 |
| 6,035,323 A | * | 3/2000 | Narayen et al. ............ 709/201 |
| 6,038,295 A | | 3/2000 | Mattes |
| 6,167,469 A | * | 12/2000 | Safai et al. .................... 710/62 |
| 6,192,407 B1 | * | 2/2001 | Smith et al. ................ 709/229 |
| 6,278,884 B1 | * | 8/2001 | Kim ........................ 455/556.1 |
| 6,642,958 B1 | * | 11/2003 | Watanabe et al. .......... 348/552 |
| 6,690,417 B1 | * | 2/2004 | Yoshida et al. .......... 348/231.1 |

FOREIGN PATENT DOCUMENTS

| | | |
|---|---|---|
| EP | 0 889 636 A2 | 1/1999 |
| EP | 0 889 636 A3 | 1/1999 |
| EP | 0 905 966 A2 | 3/1999 |
| EP | 0 905 966 A3 | 3/1999 |
| JP | 10070641 A * | 3/1998 |
| JP | 10084541 A * | 3/1998 |
| WO | WO 97/26744 A2 | 7/1997 |
| WO | WO 97/26744 A3 | 7/1997 |
| WO | WO 99/35817 A2 | 7/1999 |
| WO | WO 99/35817 A3 | 7/1999 |

* cited by examiner

*Primary Examiner*—Lin Ye
(74) *Attorney, Agent, or Firm*—Lerner, David, Littenberg, Krumholz & Mentlik, LLP (57) ABSTRACT

In an image data communication system, a digital image recording apparatus captures a desired still image or moving video image. For a color still image, the digital image recording apparatus compresses the image based on JPEG to create a color GIF (graphics interchange format) file. This file is converted to image data having an amount of data which can be processed with a portable telephone or a portable information terminal. An image sender transfers the image data generated from the digital image recording apparatus to an image distribution server. The image distribution server records the image data in an internal recording apparatus and notifies a recipient that the image is ready for distribution by sending, for example, an e-mail message to the portable telephone or the portable information terminal.

17 Claims, 6 Drawing Sheets

IMAGE DATA COMMUNICATION SYSTEM AND METHOD THEREOF, AND IMAGE PICKUP APPARATUS AND IMAGE DATA PROCESSING METHOD

CROSS-REFERENCE TO RELATED APPLICATIONS

The present application claims priority from Japanese Application No. P2000-163344 filed May 31, 2000, the disclosure of which is hereby incorporated by reference herein.

BACKGROUND OF THE INVENTION

The present invention relates to an image data communication system, and more particularly to an image data communication system and a method thereof for displaying on an image display apparatus an image signal which is generated by imaging a subject. The present invention also relates to an image pickup apparatus and an image data processing method used for the image data communication system.

A portable information device, especially a portable telephone, has a limited image data processing capability and often places limitations on the amount of data and the number of colors as regards available digital images. Accordingly, displaying an image on the portable information device requires advanced knowledge about digital images, such as an image retouching program, for example.

To solve this problem, there are provided cameras dedicated to a portable device for displaying images and a special conversion program for a personal computer. An image is created by using these hardware and software products and is input to the portable device according to a special communication protocol.

According to an available service, an image processing server is provided on the network. An image is once uploaded to the image processing server. The uploaded image is automatically converted according to the amount of data and the number of colors which can be processed on the portable information device. The converted image is then downloaded to the portable information device.

When a dedicated communication protocol is used for entering the created image to the portable device as mentioned above, special-purpose devices or programs are needed, increasing costs and causing a compatibility problem.

According to the above-mentioned method, an image processing server is provided on the network and the created image is uploaded for converting the data amount and the number of colors. This method solves the compatibility problem but necessitates additional communication costs. Currently, a mainstream digital still camera is capable of digital images of more than a million pixels, whereas a portable information device supports images of just several tens of thousands of pixels at the most. This results in uploading data several tens of times larger than the number of pixels finally needed, causing unnecessary communication costs. Since the amount of data is compressed considerably, there is a high possibility of degrading the quality of converted images. The conventional method allows confirmation of the image quality only after completion of all processes. There has been frequently a waste of time, communication costs, and charges for the service.

SUMMARY OF THE INVENTION

The present invention has been made in consideration of the foregoing. It is therefore an object of the present invention to provide an image data communication system and a method thereof which can decrease communication costs and time.

For solving the above-mentioned problems, an image data communication system according to the present invention includes an image display apparatus having a capability of displaying an image consisting of no more than a maximum amount of image data; and an image pickup apparatus operable to capture an image as an image signal, to convert the image signal to a selected amount of image data, the selected amount of image data being no greater than said maximum amount of image data, and to output the selected amount of image data to the image display apparatus.

The amount of image data does not increase during communication since the image pickup apparatus creates and outputs image data having an amount of data corresponding to the image display capability of the image display apparatus.

For solving the above-mentioned problems, the present invention provides a method for sending image data from an image pickup apparatus to an image display apparatus having a capability of displaying an image consisting of no more than a maximum amount of image data. The method includes capturing an image as an image signal in the image pickup apparatus; converting the image signal to a selected amount of image data, the selected amount of image data having no greater than the maximum amount of image data; transmitting the selected amount of image data to the image display apparatus; and receiving the selected amount of image data and displaying the selected amount of image data as an image on the image display apparatus.

The amount of image data does not increase during communication since the image signal conversion step creates image data having an amount of data corresponding to the image display capability of the image display apparatus.

For solving the above-mentioned problems, an image pickup apparatus according to the present invention includes an image pickup device operable to capture an image as an image signal; an image data processing unit operable to convert the image signal to a selected amount of image data; and an output unit operable to output the selected amount of image data.

For solving the above-mentioned problems, the present invention provides a method for generating image data from an image captured as an image signal, the image data to be displayed on an image display apparatus having a capability of displaying an image consisting of no more than a maximum amount of image data. The method includes converting the image signal to a selected amount of image data, the selected amount of image data having no greater than the maximum amount of image data.

The present invention can provide an image data communication system and a method thereof which can decrease communication costs and time.

DETAILED DESCRIPTION

Figure 1:
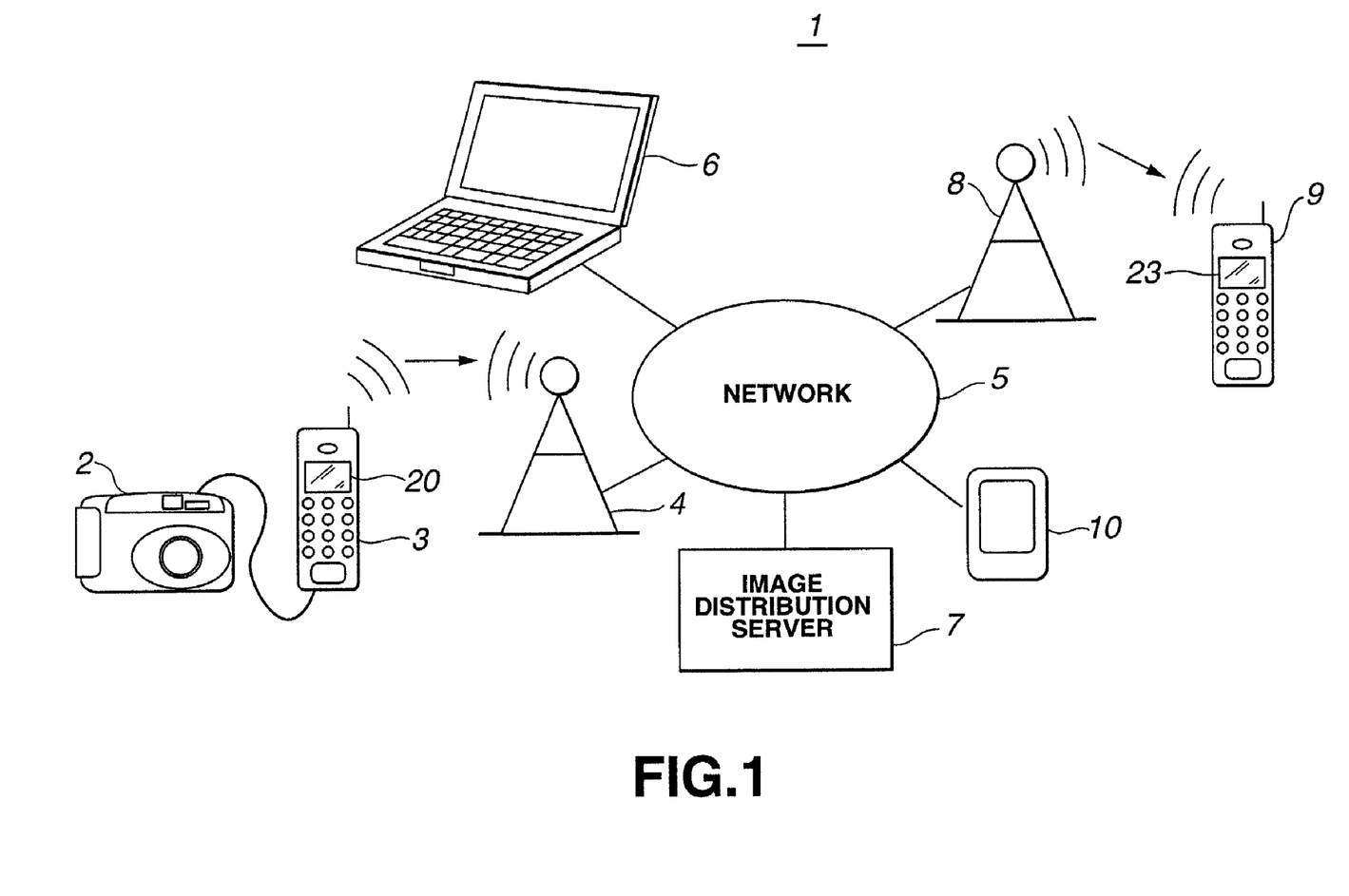
FIG. 1 shows a configuration of an image data communication system according to an embodiment of the present invention.

Embodiments of the present invention will be described in further detail with reference to the accompanying drawings. As an embodiment, FIG. 1 shows an image data communication system 1 which comprises a digital image recording apparatus 2 and a portable telephone 9. The digital image recording apparatus 2 works as an image pickup apparatus. The portable telephone 9 works as an image display apparatus for displaying an image by using image data output from the digital image recording apparatus 2.

In this image data communication system 1, the digital image recording apparatus 2 is connected to a portable telephone 3. The portable telephone 3 sends and receives an RF signal to/from a base station 4 via a wireless transmission path. The base station 4 is connected to a wired network 5, such as the Internet. The portable telephone 9 sends and receives an RF signal to/from a base station B via a wireless transmission path. The base station B is connected to the wired network 5.

The network 5 may connect with an image processing apparatus 6, such as a personal computer, and a portable information terminal 10, such as a PDA. The network 5 also may connect with an image distribution server 7.

In the image data communication system 1 as shown in FIG. 1, an image sender uses the digital image recording apparatus 2 to capture a desired still image or motion video (hereafter simply referred to as an image). The digital image recording apparatus 2 compresses the image and records it in a recording section so that the amount of data is appropriate for processing on the portable telephone 9 or the portable information terminal 10. It is assumed that, for example, 5-KB of data is appropriate for processing on the portable telephone 9 or the portable information terminal 10. This amount of data is based on the recording medium capacity in the portable telephone 9 or the portable information terminal 10 and the speed of a data transmission service for mobile communication. The above data amount may be increased when a next-generation high-speed mobile communication service is available in the future. The digital image recording apparatus 2 captures an image of a subject, for example, a color still image. This image is compressed according to the JPEG format and is further compressed as a color GIF (graphics interchange format) file so that the amount of data is appropriate for processing in the portable telephone 9 or the portable information terminal 10. At this time, it may be preferable to temporarily compress the captured color still image as a JPEG file and then as a GIF file.

The image sender connects the digital image recording apparatus 2 to the portable telephone 3 which establishes a connection to the network 5. The recorded 5-KB image data is transferred to the image distribution server 7. The image distribution server 7 records the image data transferred from the digital image recording apparatus 2 on an internal recording apparatus. The image distribution server 7 then sends an e-mail message to the portable telephone 9 or the portable information terminal 10 to notify a recipient that an image is available for distribution. The recipient can download the image from the image distribution server 7 by operating the portable telephone 9 or the portable information terminal 10.

In the above description, the image distribution server 7 temporarily stores image data. The present invention also permits a system configuration without the image distribution server 7. In this case, the image sender connects the digital image recording apparatus 2 to the portable telephone 3 and directly transfers image data to the recipient's portable telephone 9 or portable information terminal 10.

In the description so far, the digital image recording apparatus 2 is connected to the portable telephone 3. This is an example of means for connecting the digital image recording apparatus 2 to the network 5. Instead of the portable telephone 3, it may be preferable to use connection means such as a stationary telephone and a networked personal computer. It also may be preferable to directly connect the digital image recording apparatus 2 to the network 5 by eliminating the portable telephone 3. In this case, the digital image recording apparatus 2 may not only be a camera and a scanner, but also a CCD-camera equipped PDA or portable telephone.

An image sending source may be the image processing apparatus 6 connected to the network 5. In this case, the sender converts a prepared image using the image processing apparatus 6 so that the amount of data is appropriate for processing on the portable telephone 9 or the portable information terminal 10. Thereafter, the image is distributed via the network 5 as mentioned above.

Figure 2:
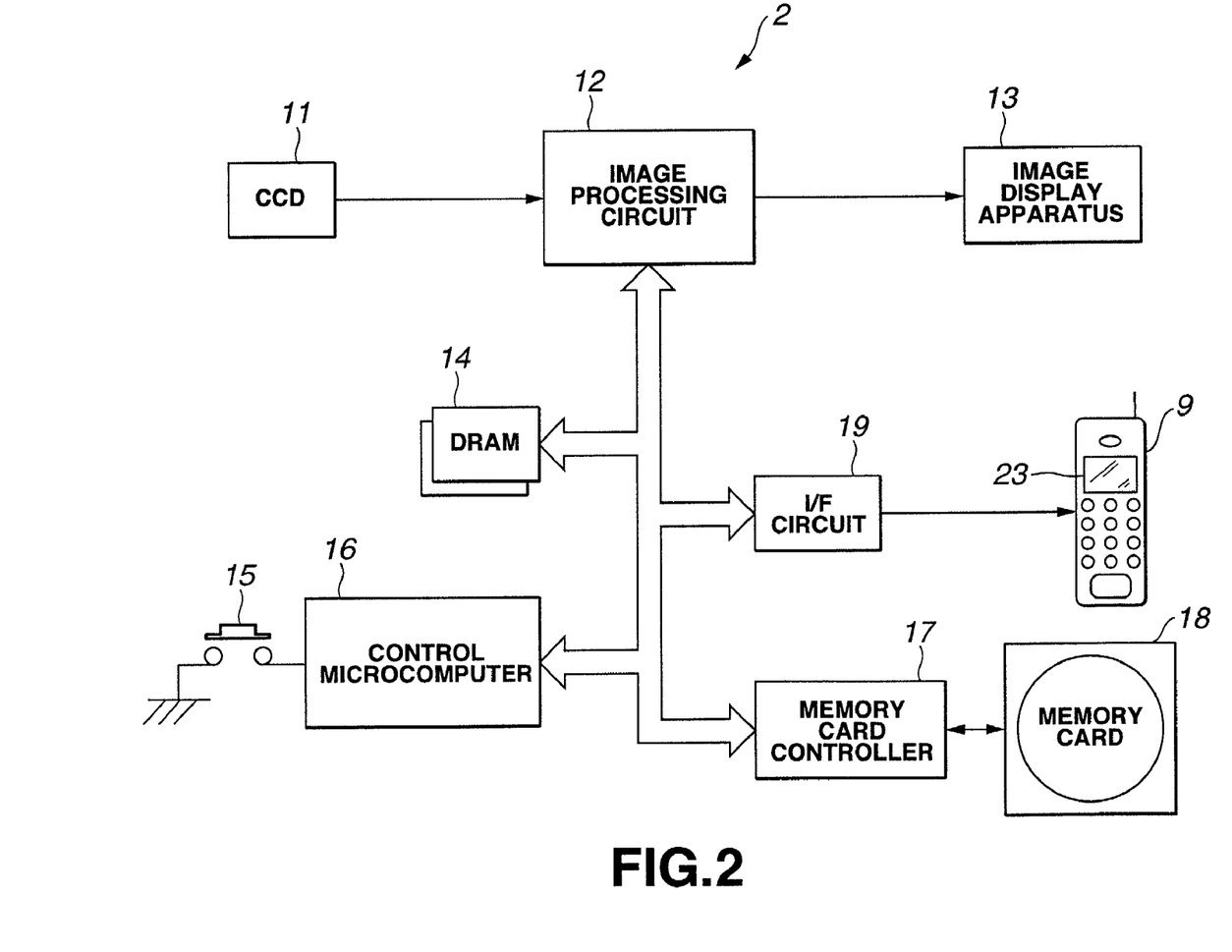
FIG. 2 is a block diagram showing a configuration of a digital image recording apparatus constituting the image data communication system.
Figure 3:
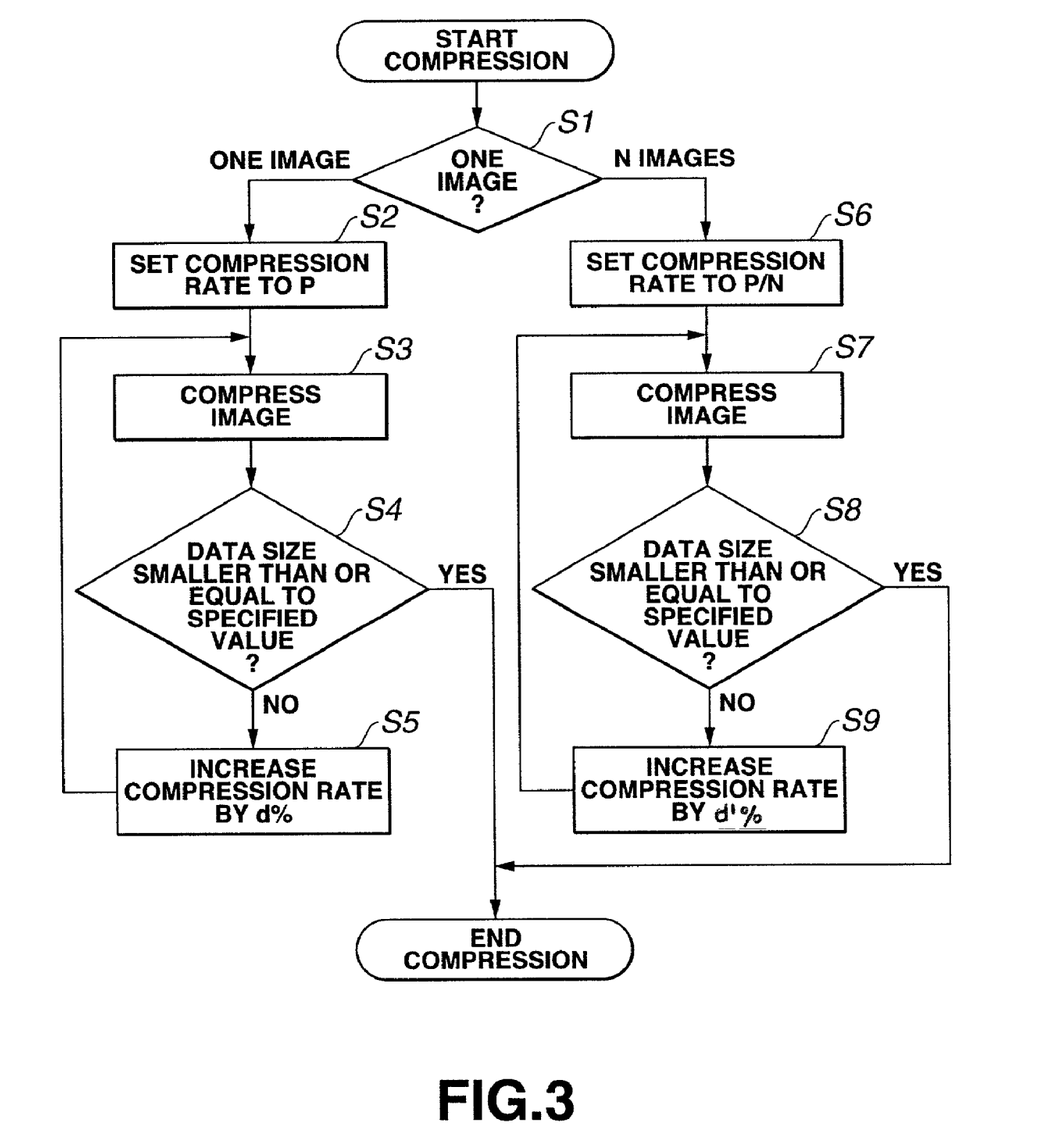
FIG. 3 is a flowchart showing an image compression algorithm when the digital image recording apparatus compresses an image.

The following describes a detailed configuration and operation of the digital image recording apparatus 2 with reference to FIGS. 2 and 3. In the digital image recording apparatus 2 as shown in FIG. 2, a CCD 11 works as an image pickup device operable to image a subject and generate an image signal. An image processing circuit 12 processes the image signal and outputs image data with a data size which complies with the image display capability of the destination, such as the portable telephone 9 or the portable information terminal 10.

An image captured by the CCD 11 is processed in the image processing circuit 12 and is displayed on the image display apparatus 13. The image display apparatus 13 can be a built-in LCD panel or EVF display, an externally connected TV monitor, and the like.

When a user presses a shutter button 15, an image captured by the CCD 11 is temporarily recorded in DRAM 14 via the image processing circuit 12. The image data recorded in the DRAM 14 is compressed by the image processing circuit 12 and is written back to the DRAM 14. The compression follows an algorithm as shown in the flowchart of FIG. 3 to be described later. During the compression, data is compressed to an amount which can be processed by the portable telephone 9 or the portable information terminal 10. The compressed image data written back to the DRAM 14 is recorded in a memory card 18 via a memory card controller 17.

For reproducing an image recorded in the memory card 18, the compressed image data is read from the memory card 18 via the memory card controller 17 and is recorded in the DRAM 14. The compressed image data is expanded in the image processing circuit 12 and is written back to the DRAM 14. The image data written back to the DRAM 14 is processed in the image processing circuit 12 and is displayed on the image display apparatus 13.

For transferring an image recorded in the memory card 18 to a portable telephone, the compressed image data is read from the memory card 18 via the memory card controller 17 and is recorded in the DRAM 14. The compressed image data recorded in the DRAM 14 is transferred to the portable telephone 9 via the I/F circuit 19.

A controller microcomputer 16 controls transfer of image data between the blocks. In the above description, compressed image data is recorded in the memory card 18. The system configuration may use removable built-in nonvolatile memory for storing compressed image data.

The following describes an image compression algorithm with reference to FIG. 3 when the digital image recording apparatus 2 compresses an image.

When the image compression starts, it is checked whether to compress one image or a plurality of images (step S1). Here, a plurality of images refers to a plurality of still images and a plurality of motion images.

When one image is to be compressed, control advances to step S2 to set a predefined value P as an initial compression rate. The compression rate P is a provisional term used for explaining a compression degree. In actual processing, a compression rate may comprise a plurality of parameters. When the compression rate P is specified, the image is compressed according to the specified value at step S3. When the compression is complete, the resulting image data amount is checked at step S4. When the data amount is smaller than or equal to the predefined value, the compression terminates. This predefined value corresponds to a size capable of processing in the portable telephone 9 or the portable information terminal 10. When the data amount exceeds the specified value, the compression rate P is increased by amount d % (step S5). The compression is repeated at S3. This processing is repeated until the compressed image data amount becomes smaller than or equal to the specified value. According to this algorithm, the compression rate is increased by d % at step S5. It may be preferable to determine the compression rate by providing a compression rate table or using a function for finding the compression rate.

When a plurality of images (N images) are to be compressed at step S1, a value P/N is specified as an initial compression rate (step S6) and the compression is performed (step S7). Thereafter, the image data amount is checked at step S8. When the data amount is smaller than or equal to the specified value, the compression terminates. When the data amount exceeds the specified value, the compression rate is increased by amount d' % (step S9) and the compression is reexecuted (step S7). This processing is repeated until the image data amount becomes smaller than or equal to the specified value. With respect to the compression rate P/N, a value 1/N indicates that the compressed data amount should be controlled likewise for one image and a plurality of images. However, the value 1/N does not always take effect depending on an image characteristic. Like the case for one image, there can be several methods of setting the amount d' % for increasing the compression rate.

In the above algorithm, the specified data amount value may be stored in the nonvolatile memory of the digital image recording apparatus or entered by a user.

Figure 4:
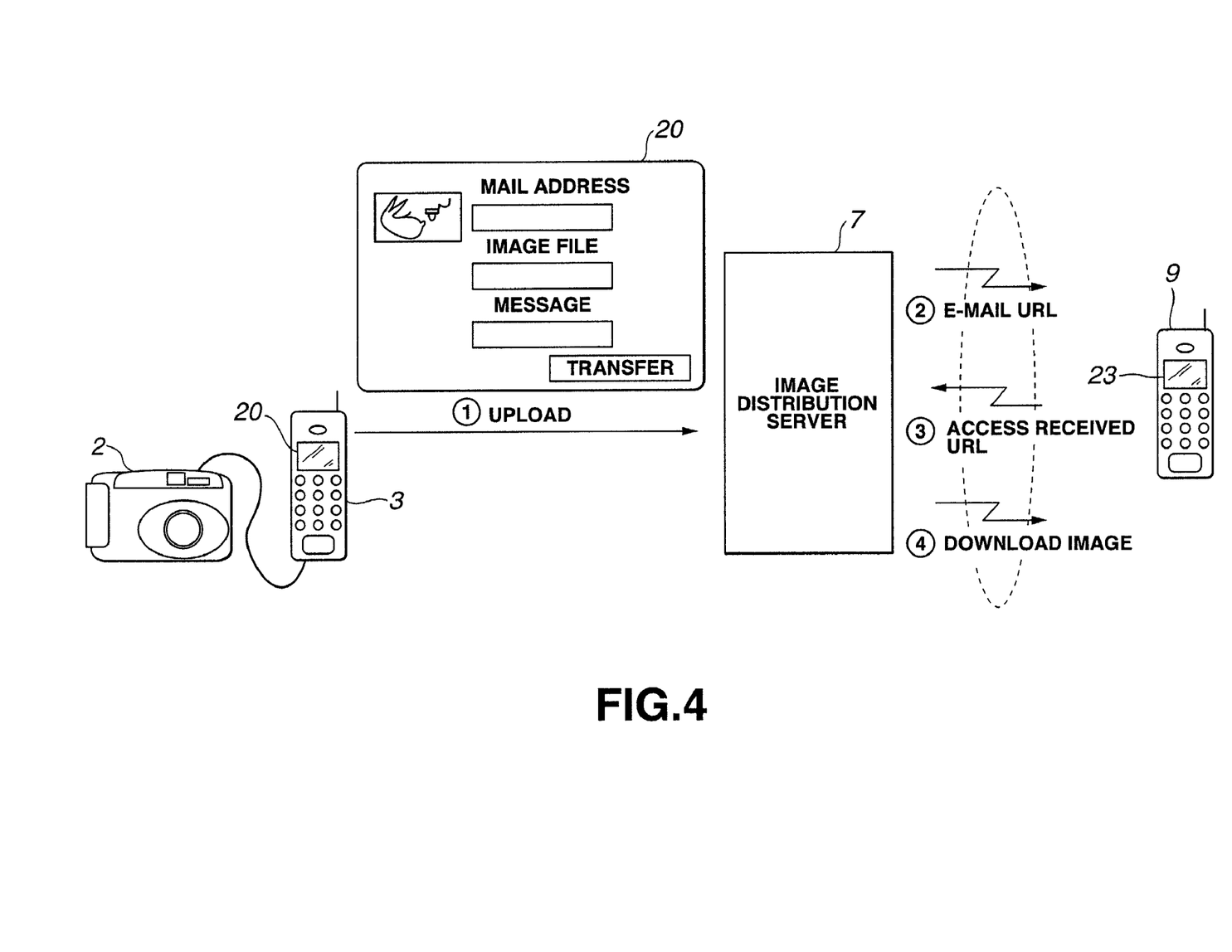
FIG. 4 illustrates a sequence of operations in which image data received by a digital image recording apparatus is temporarily stored in an image distribution server networked via a portable telephone and is displayed on the portable telephone.

With reference to FIG. 4, the following describes a sequence of operations in the image data communication system 1. Namely, 5-KB image data captured by the digital image recording apparatus 2 is temporarily stored in the image distribution server 7 connected to the network 5 via the portable telephone 3 and is displayed on the portable telephone 9.

For example, 5-KB image data is captured by the digital image recording apparatus 2, and is converted to a color GIF file having an amount of data which can be processed in the portable telephone 9. The image data is displayed on a display section 20 of the portable telephone 3. This display section 20 is the same as the image display apparatus 13 in FIG. 2. At this time, the 5-KB data (color GIF file) is provided with additional data, such as a mail address, an image file name, a message, and the like, according to key operations on the portable telephone 3. When a transfer button is operated on the display section 20, the GIF file with additional data is uploaded to the image distribution server 7 via the wireless transmission path and the wire network 5 (1). The image distribution server 7 generates a URL and a mail message in a specified mode and sends this message to the portable telephone 9 (2). When the portable telephone 9 is used to access the URL sent from the image distribution server 7 (3), the GIF file is downloaded from the image distribution server 7 (4).

Figure 5:
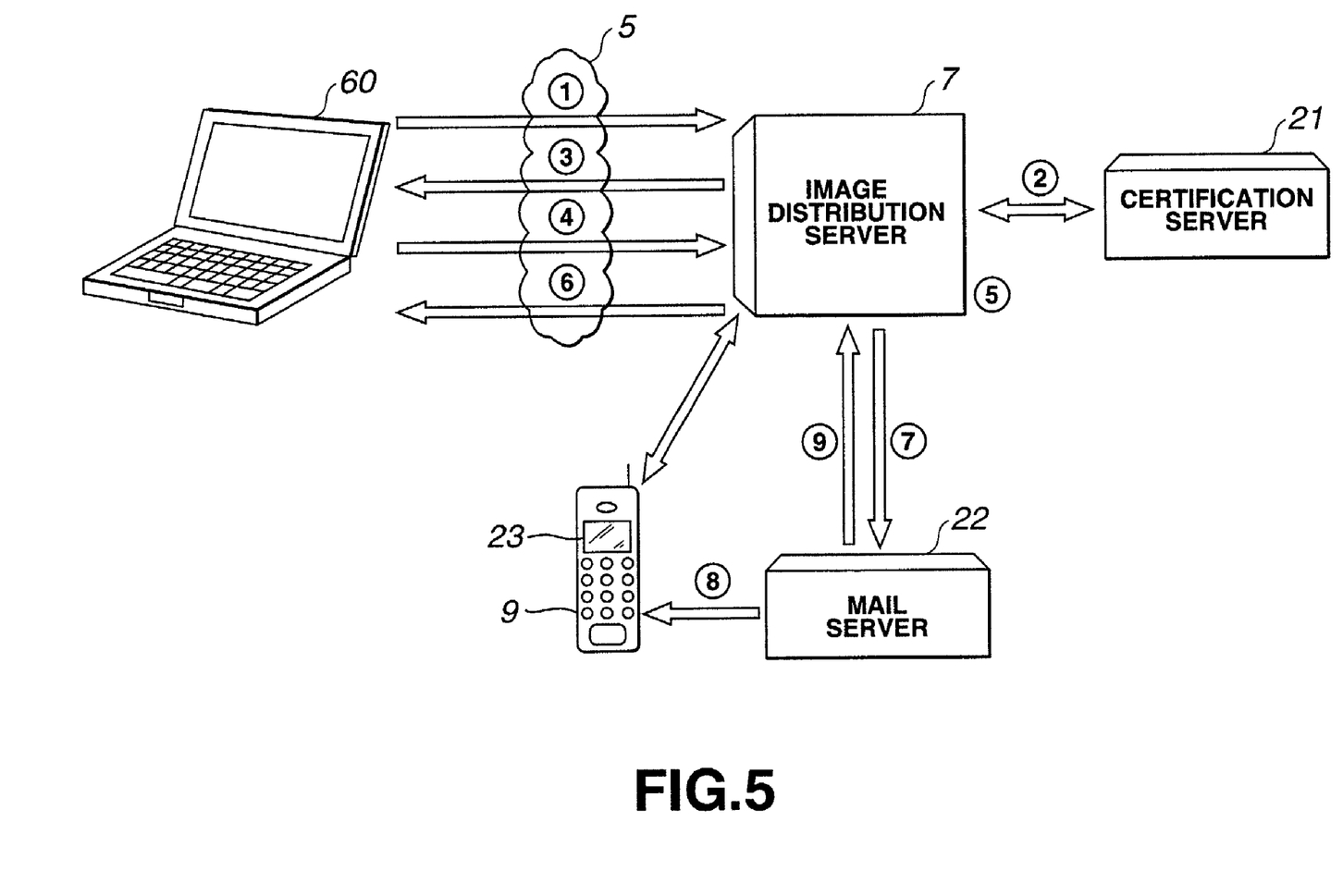
FIG. 5 illustrates a sequence of operations in which a GIF file with additional data from a digital image recording apparatus is temporarily uploaded to an image distribution server via a personal computer and then is sent to a portable telephone.

FIG. 5 illustrates a sequence of operations in which a GIF file with additional data from the digital image recording apparatus 2 is temporarily uploaded to an image distribution server 7 via a personal computer 60 and then is sent to the portable telephone 9.

The personal computer 60 activates software for uploading images. Pressing a send button on the personal computer 60 transmits a customer ID and a password (provisional ID and password) to the image distribution server 7 according to the HTTPS protocol (1). The image distribution server 7 checks a certification or authentication server 21 based on the ID and password transmitted from the personal computer 60 (2). The image distribution server 7 then returns a result of checking the ID and password to the personal computer 60 (3).

When the image distribution server 7 returns a successful check result, the software active in the personal computer 60 uses the HTTPS protocol to send to the image distribution server 7 a customer ID and password (provisional ID and password), a password for viewing GIF files, a sender name, a sender's mail address, a recipient name, a specified mail address, a 5-KB GIF file, a message attached to an image, and the like (4).

Based on the transmitted data, the image distribution server 7 generates a mail message in a specified mode, a URL, and HTML files for a password check screen and a viewer page (5). The image distribution server 7 returns a processing result to the personal computer 60 (6).

Then, the image distribution server 7 sends a mail message in a specified mode to a mail server 22 according to a fixed mail format used for the mail server 22 (7). The mail server 22 distributes the mail message in the specified mode to the portable telephone 9 (8). When the above mail message causes an error, the error mail message is returned to the image distribution server 7 (9).

Figure 6:
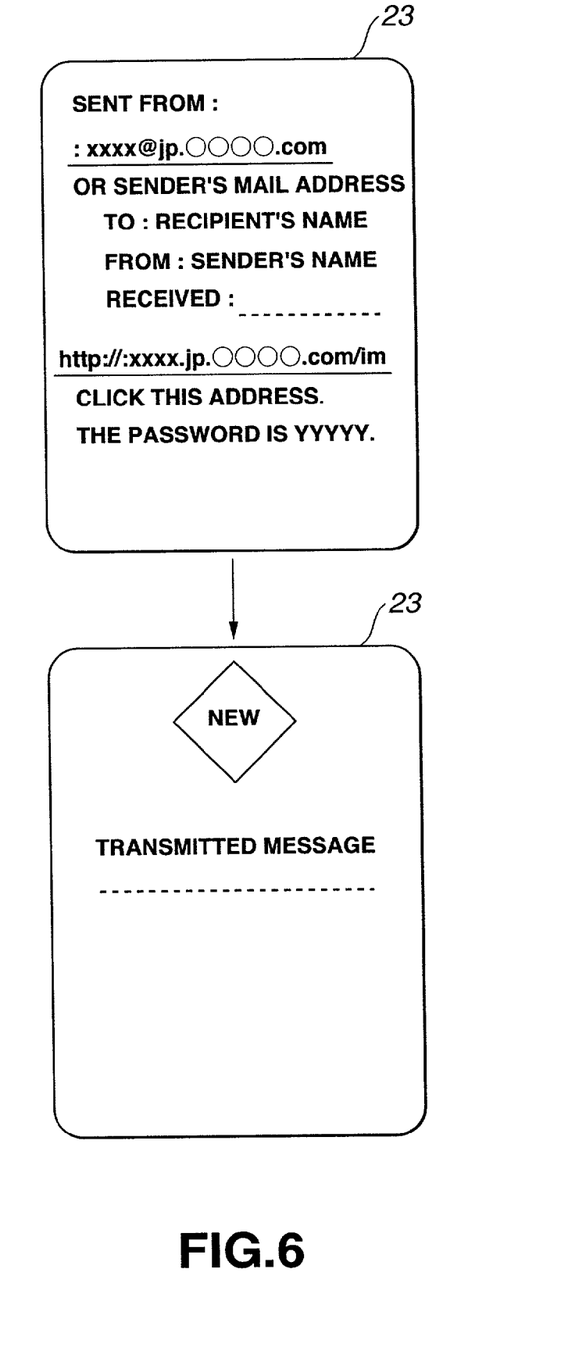
FIG. 6 shows an example of the display content in the display section of a receiving portable telephone.

FIG. 6 shows an example of a mail message in a specified mode distributed to the portable telephone 9 and displayed on a display section 23 thereof. When a recipient clicks the URL, he or she is prompted to enter a password for viewing the GIF file. After the password is entered successfully, the GIF file can be viewed.

The image data communication system 1 has been described in detail. As mentioned above, the digital image recording apparatus 2 creates beforehand an image compressed to the amount of data which can be processed in the receiving portable telephone or portable information terminal. This can minimize the amount of data to be uploaded to the network 5, thus decreasing communication costs and time.

After the amount of data is decreased, the image quality can be confirmed before data transfer. This can prevent the wasting of communication costs and time when the image quality is found to be unsatisfactory after the data transfer.

The network does not always need to have a server for converting images, making the system configuration easy. It is possible to decrease costs for the system configuration and operations.

It is unnecessary to use dedicated image recording equipment or communication protocol, decreasing costs and ensuring versatility.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An image data communication system, comprising:
    an image processing apparatus comprising an image processing circuit for converting a captured image signal to image data having a reduced data size that can be readily processed in a remotely located image display apparatus of a transmission destination and a transmission circuit for outputting said image data along with additional data including an e-mail address associated with said image display apparatus, a message to be displayed with said converted image data, and user identification and/or password information; and
    an image distribution server remotely located from said image processing apparatus for receiving said converted image data and said additional data, and for authenticating the user identification and/or password information by use of a certification server; and, only when the user identification and/or password information has been successfully authenticated, for generating a URL used for retrieving and viewing said image data, and transmitting said URL to said image display apparatus using said e-mail address;
    said image display apparatus being operative to receive an e-mail message with said URL, retrieve said converted image data by clicking on said URL displayed on the e-mail message and display a message and an image using said retrieved converted image data.

2. The image data communication system according to claim 1, wherein said image processing apparatus records said image signal onto a recording medium.

3. The image data communication system according to claim 1, wherein said image display apparatus is a portable terminal capable of displaying an image.

4. The image data communication system according to claim 1, wherein said image processing apparatus uses a subtractive color process to convert said image signal to said image data having a data size in compliance with an image display capability of the image display apparatus.

5. The image data communication system according to claim 1, wherein said image data output from said image processing apparatus is sent to said image display apparatus via a wired network.

6. The image data communication system according to claim 5, wherein said image data output from said image processing apparatus is uploaded with said data size unchanged to an image storage server connected to said wired network.

7. The image data communication system according to claim 6, wherein said image display apparatus downloads said image data from said image storage server.

8. The image data communication system according to claim 1, wherein said image data output from said image processing apparatus is sent to said display apparatus via a wireless transmission path and a wired network.

9. The image data communication system according to claim 8, wherein said image data output from said image processing apparatus is uploaded with said data size unchanged to an image storage server connected to said wired network.

10. The image data communication system according to claim 9, wherein said image display apparatus downloads said image data from said image storage server.

11. The image data communication system according to claim 1, further comprising communication apparatus connected to said image processing apparatus, and wherein said image data is output to said image display apparatus via said communication apparatus.

12. The image data communication system according to claim 1, wherein said image processing apparatus includes a communication apparatus operative to output said image data from said image processing apparatus.

13. The image data communication system according to claim 1, wherein said image display apparatus includes a communication apparatus operative to receive said image data.

14. The image data communication system according to claim 1, wherein, when the number of images to be reduced is N that is greater than one, said image processing apparatus specifies an initial compression rate as one Nth of a normal initial compression rate.

15. A method for sending image data from an image pickup apparatus to a remotely located image display apparatus comprising:
    converting an image signal captured by the image pickup apparatus to image data having a reduced data size that can be readily processed in the image display apparatus;
    outputting the image data with additional data including an e-mail address associated with the image display apparatus, a message to be displayed with said converted image data, and user identification and/or password information;
    receiving the converted image data and the additional data at an image distribution server;
    authenticating the user identification and/or password information by use of a certification server;
    generating a URL used for retrieving and viewing the image data, and transmitting the URL by the image distribution server to the image display apparatus using the e-mail address only when the user identification and/or password information has been successfully authenticated;

receiving an e-mail message with the URL at the image display apparatus;
retrieving the converted image data by clicking on the URL displayed on the e-mail message; and
displaying a message and an image on the image display apparatus using the retrieved converted image data.

16. The method according to claim 15, wherein said retrieving said image data includes transmitting said image data to the image display apparatus using at least one of a wireless transmission path or a wired network.

17. The method according to claim 15, further comprising specifying, when the number of images to be reduced is N that is greater than one, an initial compression rate as one Nth of a normal initial compression rate.

* * * * *